(12) United States Patent
Fusejima et al.

(10) Patent No.: US 10,260,807 B2
(45) Date of Patent: Apr. 16, 2019

(54) DRYING DEVICE AND CONTINUOUS GRANULE PRODUCTION SYSTEM

(71) Applicant: FREUND CORPORATION, Tokyo (JP)

(72) Inventors: Yasutoyo Fusejima, Tokyo (JP); Hirotsune Yasumi, Tokyo (JP); Shigemi Isobe, Tokyo (JP); Norikazu Saitou, Tokyo (JP); Takashi Terada, Tokyo (JP); Naoko Mizuno, Tokyo (JP)

(73) Assignee: FREUND CORPORATION, Tokyo (JP)

( * ) Notice: Subject to any disclaimer, the term of this patent is extended or adjusted under 35 U.S.C. 154(b) by 201 days.

(21) Appl. No.: 14/898,874

(22) PCT Filed: Jun. 25, 2014

(86) PCT No.: PCT/JP2014/066778
§ 371 (c)(1),
(2) Date: Dec. 16, 2015

(87) PCT Pub. No.: WO2015/002039
PCT Pub. Date: Jan. 8, 2015

(65) Prior Publication Data
US 2016/0131426 A1    May 12, 2016

(30) Foreign Application Priority Data

Jul. 5, 2013  (JP) ................................. 2013-141534
Dec. 2, 2013  (JP) ................................. 2013-249495
Apr. 9, 2014  (JP) ................................. 2014-079941

(51) Int. Cl.
*F26B 17/10*    (2006.01)
*F26B 3/10*    (2006.01)
(Continued)

(52) U.S. Cl.
CPC ............ *F26B 17/105* (2013.01); *B01J 2/006* (2013.01); *B01J 2/10* (2013.01); *B01J 2/20* (2013.01);
(Continued)

(58) Field of Classification Search
CPC ...... F26B 17/105; F26B 17/107; F26B 17/24; F26B 3/10; B01J 2/20; B01J 2/10; B01J 2/006
See application file for complete search history.

(56) References Cited

U.S. PATENT DOCUMENTS 4,608,766 A    9/1986  Kawai et al.
5,711,744 A *  1/1998  Strawcutter .............. A63B 9/00
                                                 482/35
(Continued)

FOREIGN PATENT DOCUMENTS

JP    58-72868    4/1983
JP    59-25094    2/1984
(Continued)

OTHER PUBLICATIONS

International Search Report dated Sep. 16, 2014 in International (PCT) Application No. PCT/JP2014/066778.
(Continued)

*Primary Examiner* — Jessica Yuen
(74) *Attorney, Agent, or Firm* — Wenderoth, Lind & Ponack, L.L.P.

(57) ABSTRACT

An airflow drying device includes a granulated substance introduction portion, a dry process portion, and a product ejection portion. The granulated substance introduction portion includes a granulated substance inlet into which granulated substances are to be put, and a hot air inlet into which hot air is to be supplied. The dry process portion includes a loop pipe. The loop pipe is positioned laterally in a horizontal direction, and is able to dry granulated substances. The product ejection portion includes a cyclone collector where the granulated substances are collected after being dried through the loop pipe.

12 Claims, 15 Drawing Sheets

(51) Int. Cl.
 *F26B 17/24* (2006.01)
 *B01J 2/00* (2006.01)
 *B01J 2/10* (2006.01)
 *B01J 2/20* (2006.01)

(52) U.S. Cl.
 CPC .............. *F26B 3/10* (2013.01); *F26B 17/107* (2013.01); *F26B 17/24* (2013.01)

(56) References Cited

U.S. PATENT DOCUMENTS

| | | | |
|---|---|---|---|
| 6,264,989 | B1 | 7/2001 | Kato et al. |
| 6,270,708 | B1 * | 8/2001 | Gurol ............... B02C 13/18 264/117 |
| 2003/0190417 | A1 | 10/2003 | Takei et al. |

FOREIGN PATENT DOCUMENTS

| | | |
|---|---|---|
| JP | 61-3986 | 1/1986 |
| JP | 61-173809 | 10/1986 |
| JP | 1-139188 | 9/1989 |
| JP | 6-32710 | 4/1994 |
| JP | 10-17147 | 1/1998 |
| JP | 2000-290671 | 10/2000 |
| JP | 2000-304439 | 11/2000 |
| JP | 2000-317288 | 11/2000 |
| JP | 2001-132712 | 5/2001 |
| JP | 2002-18266 | 1/2002 |
| JP | 2004-67670 | 3/2004 |
| JP | 2005-76676 | 3/2005 |
| JP | 2010-266179 | 11/2010 |
| JP | 2011-33269 | 2/2011 |
| JP | 2014-25506 | 2/2014 |
| WO | 2008/104923 | 9/2008 |
| WO | 2010/128359 | 11/2010 |

OTHER PUBLICATIONS

International Preliminary Report on Patentability and Written Opinion of the International Searching Authority dated Jan. 14, 2016 in International (PCT) Application No. PCT/JP2014/066778.

* cited by examiner

[FIG.1]
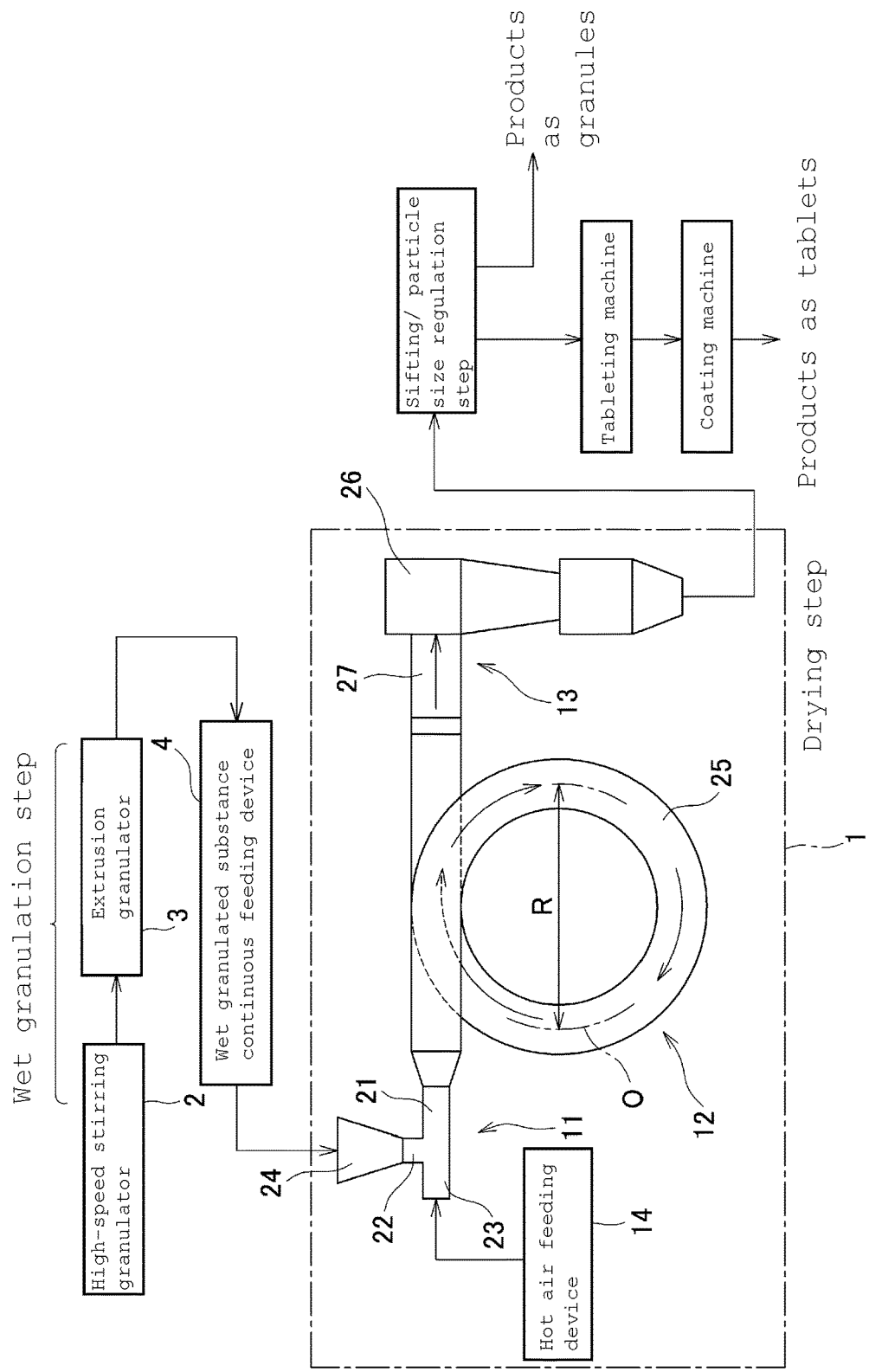

[FIG.2]
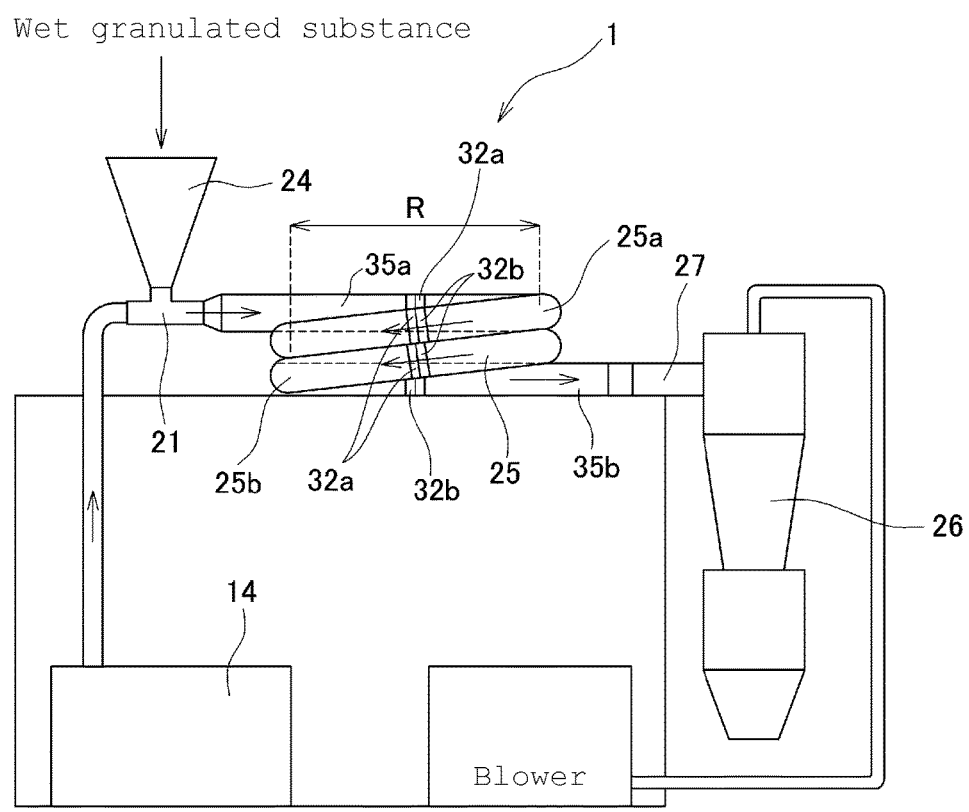

[FIG.3]
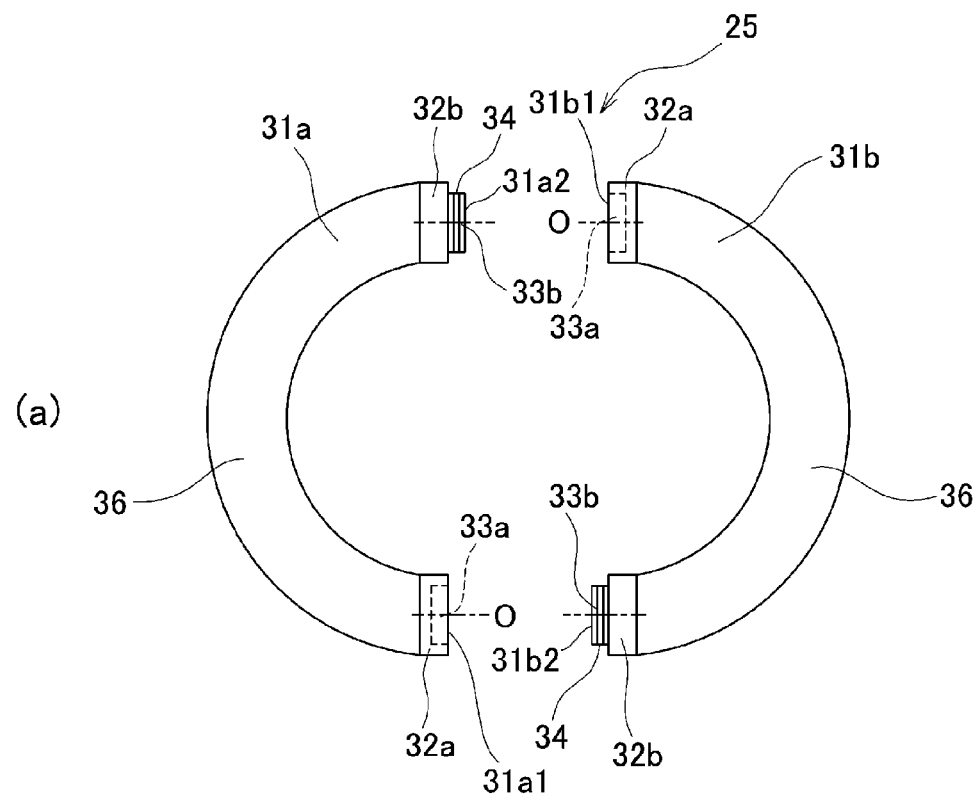
(a)
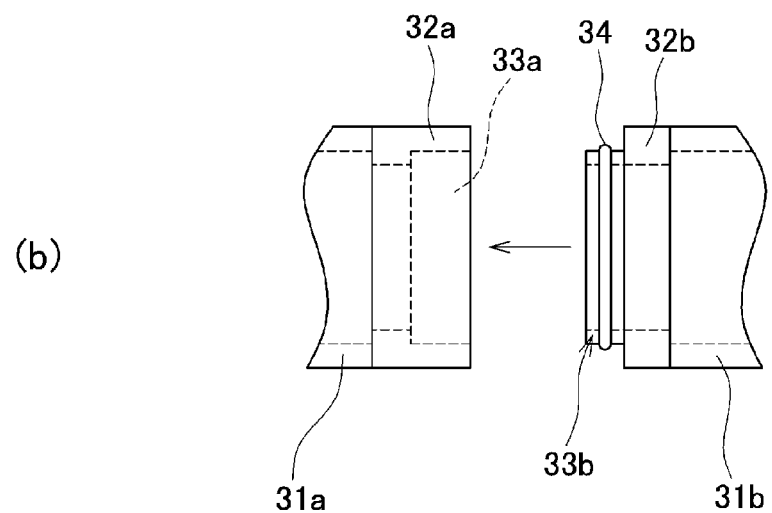
(b)

[FIG.4]
(a) 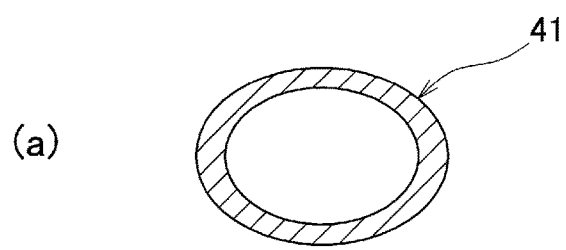
(b) 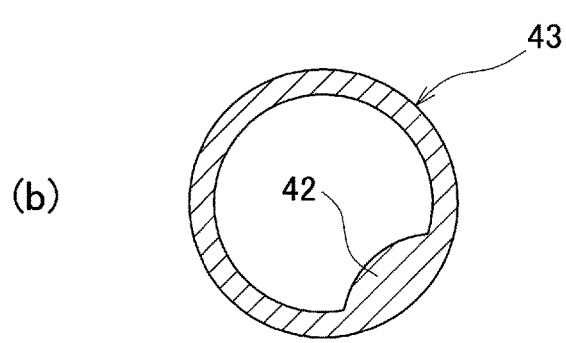

[FIG.5]
(a)
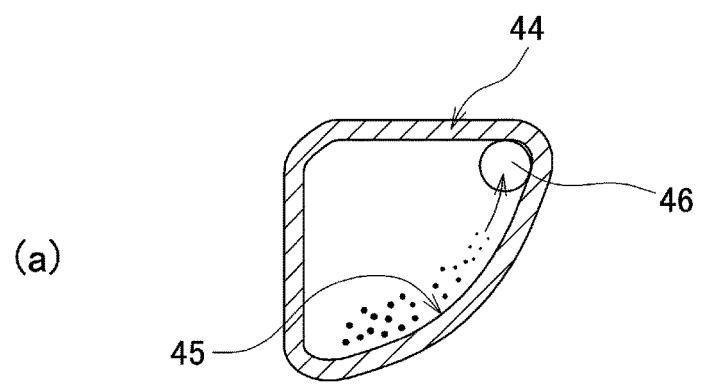
(b)
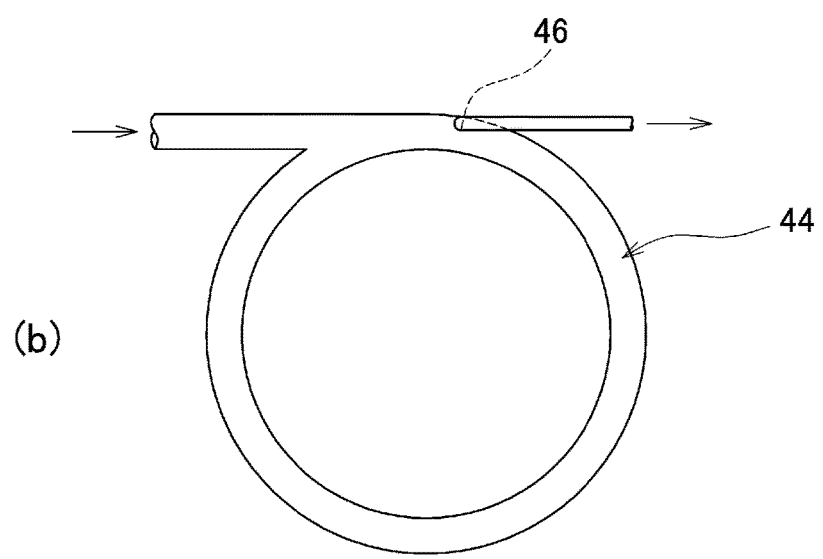

[FIG.6]
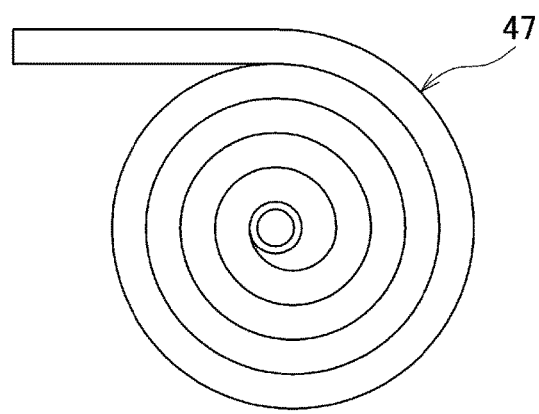
[FIG.7]
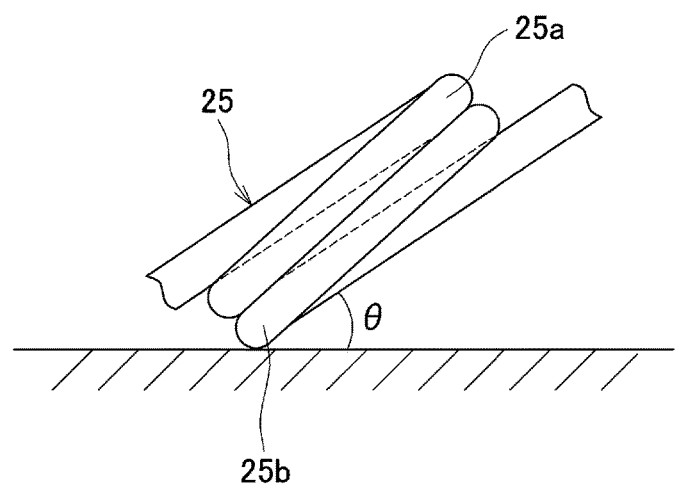

[FIG.8]
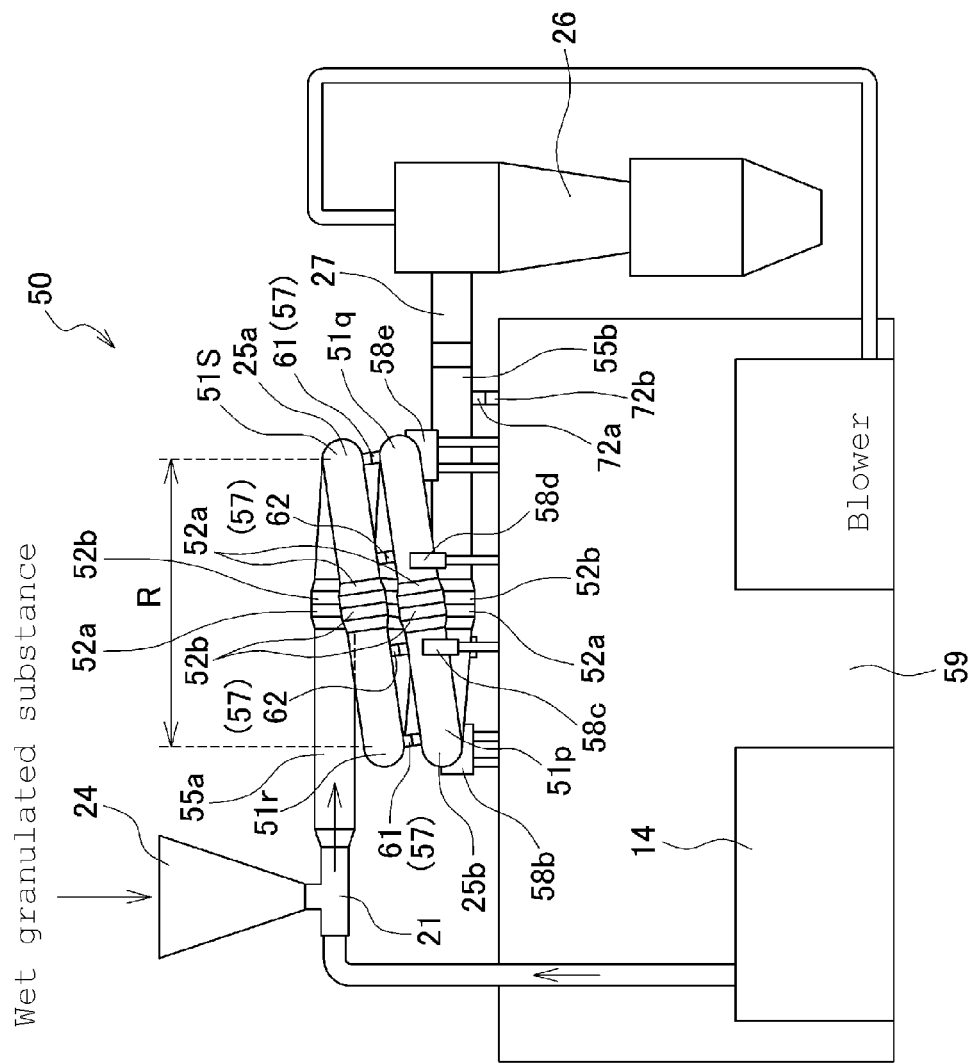

[FIG.9]
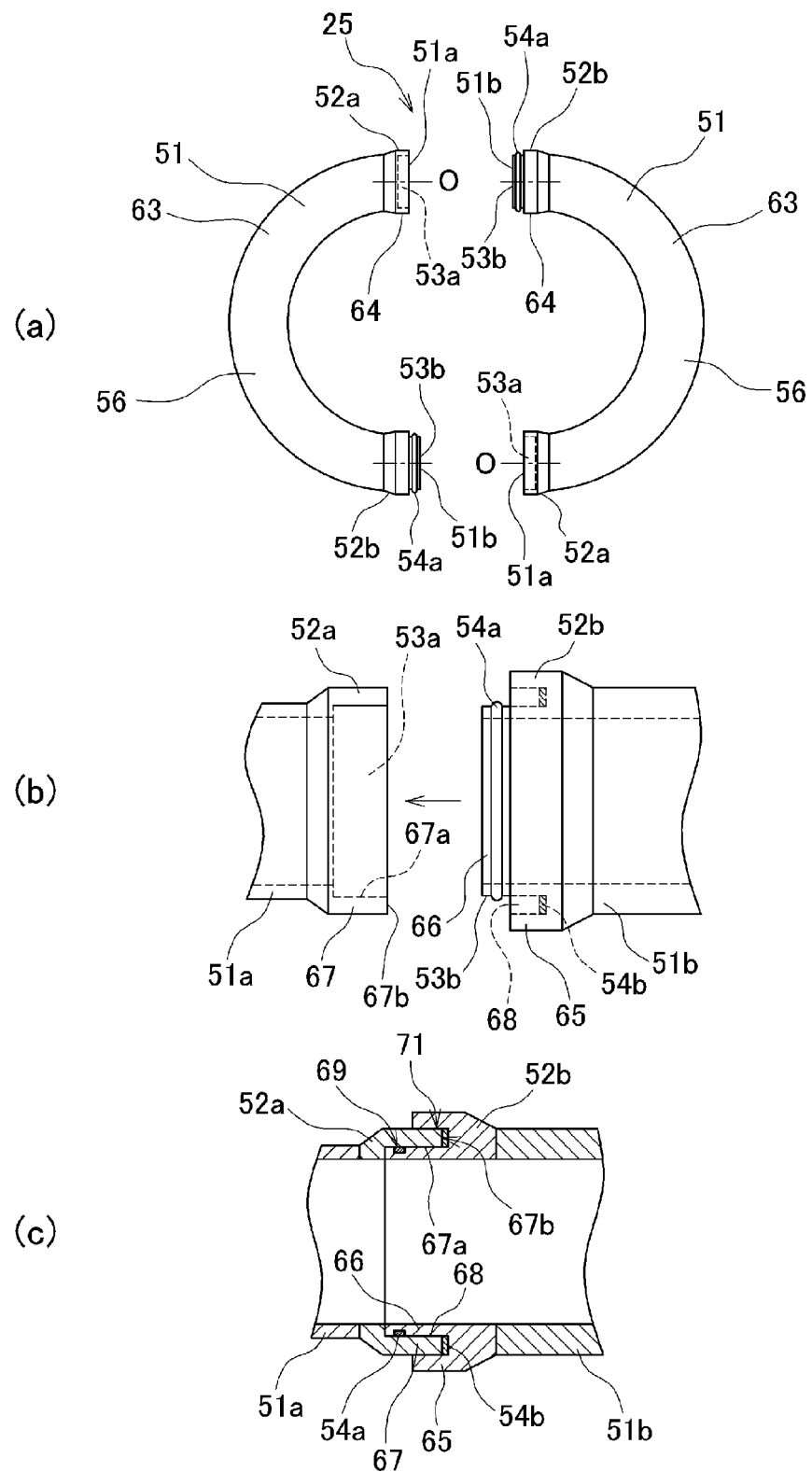

[FIG.10]
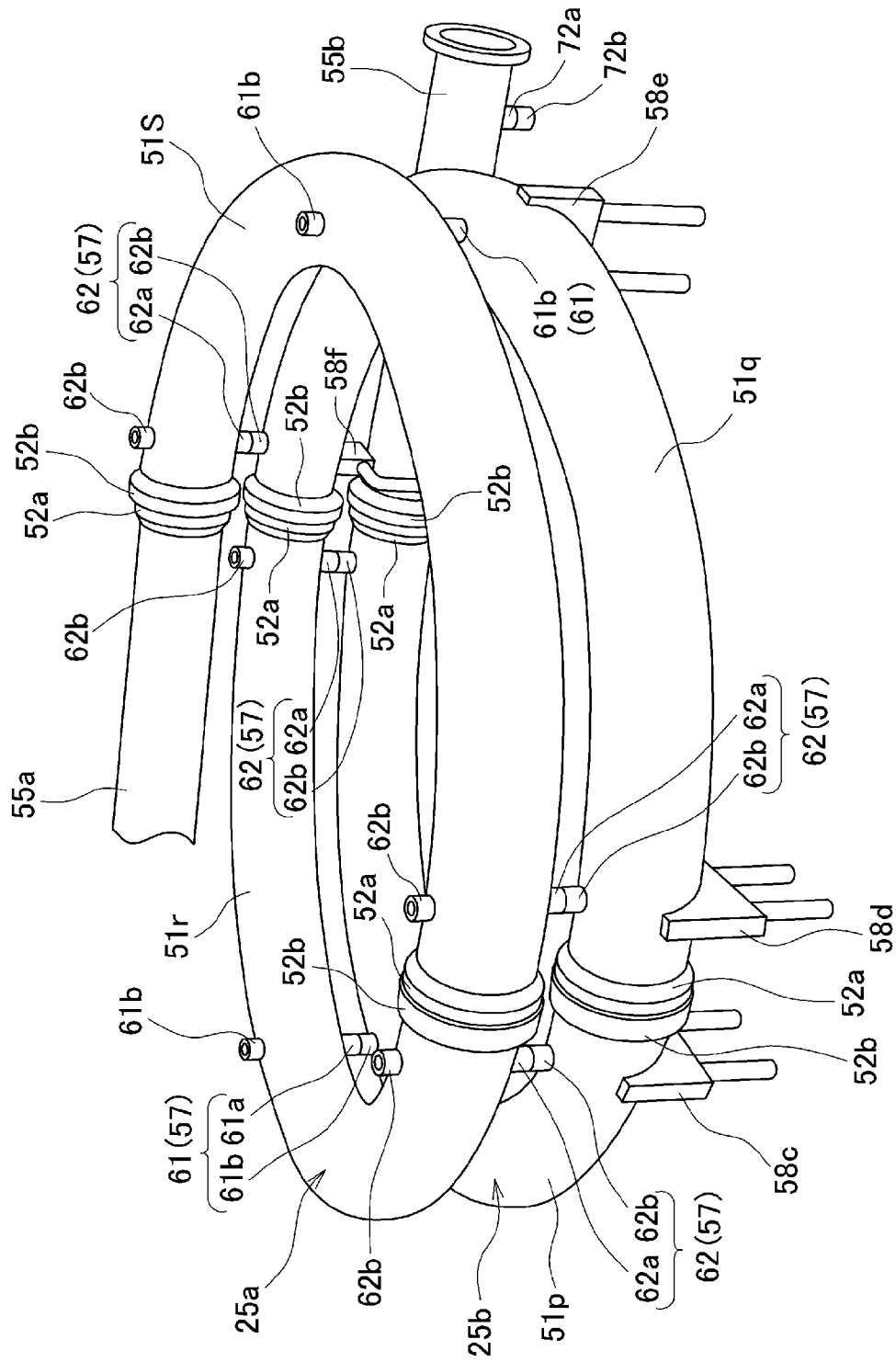

[FIG.11]
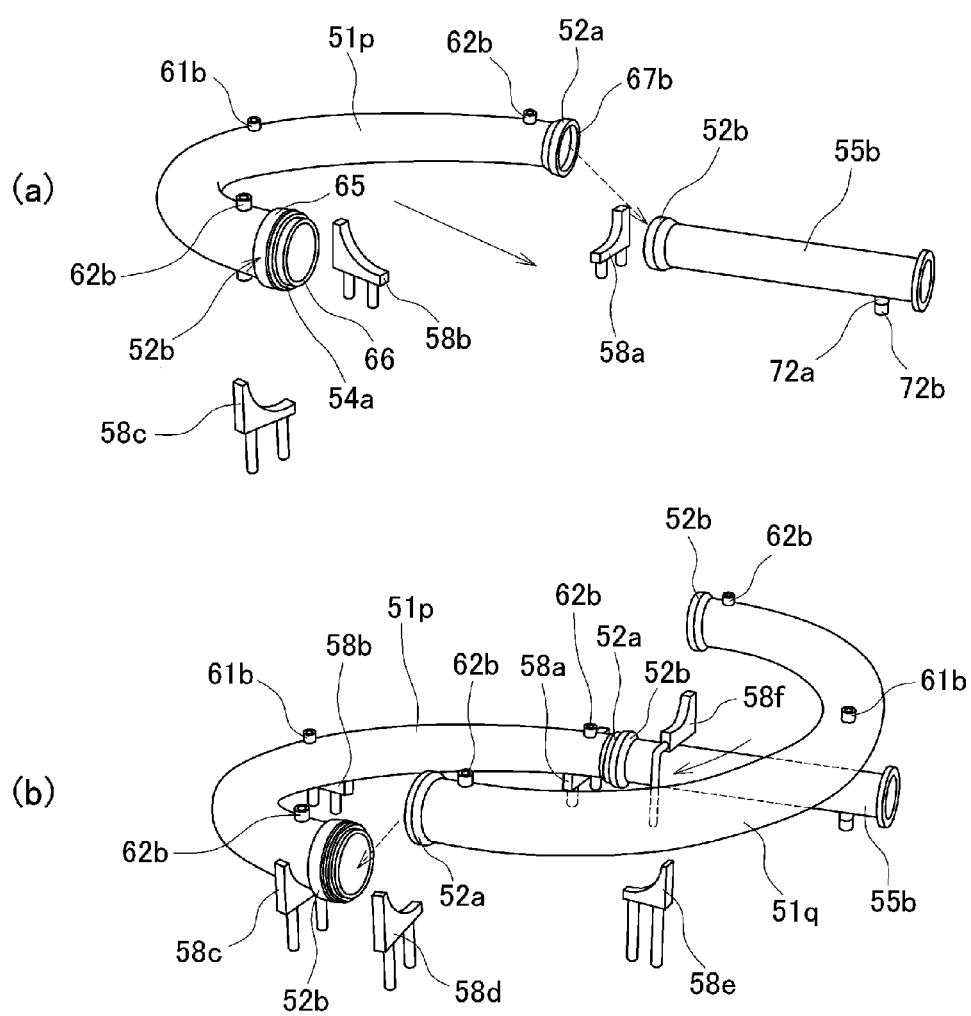

[FIG.12]
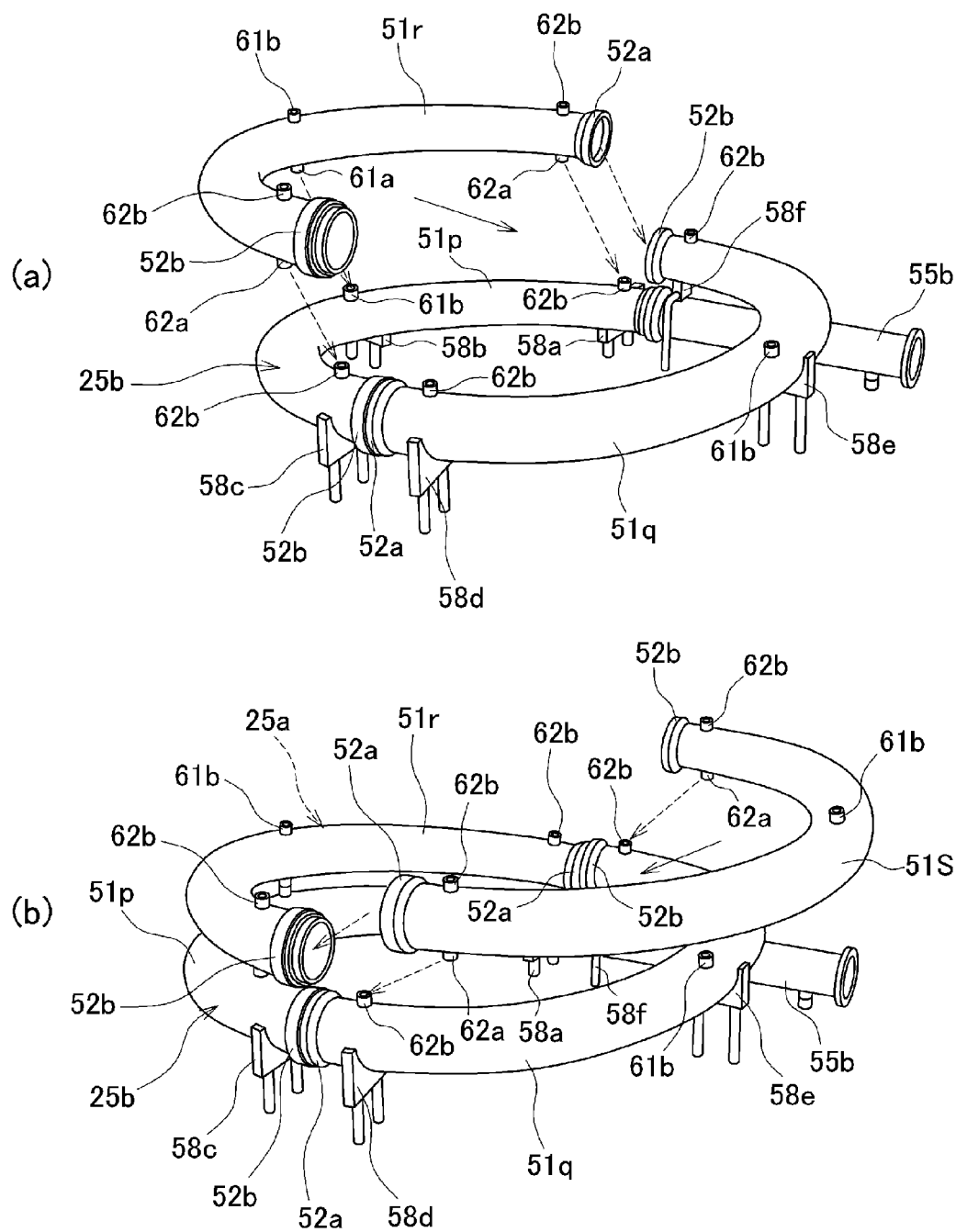

[FIG.13]
(a) 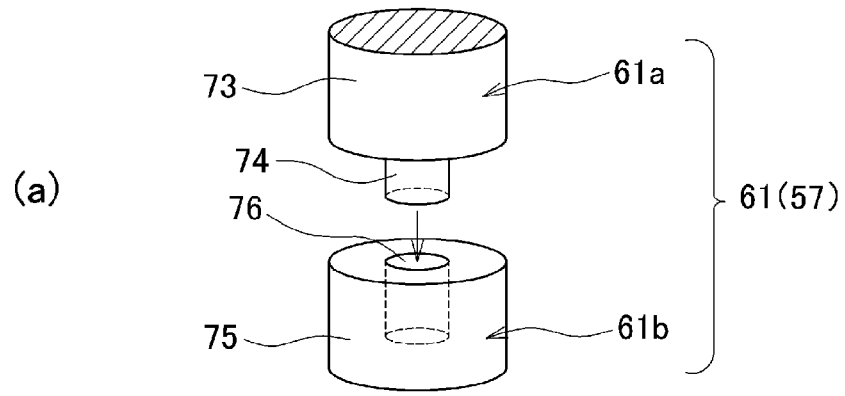
(b) 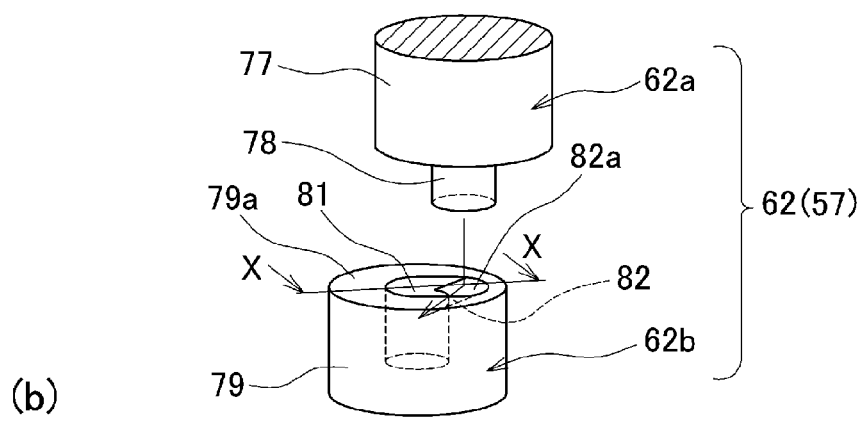
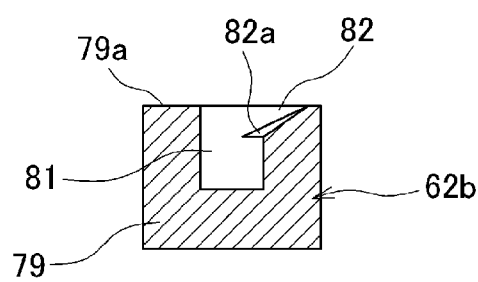
<Cross section X-X>

[FIG.14]
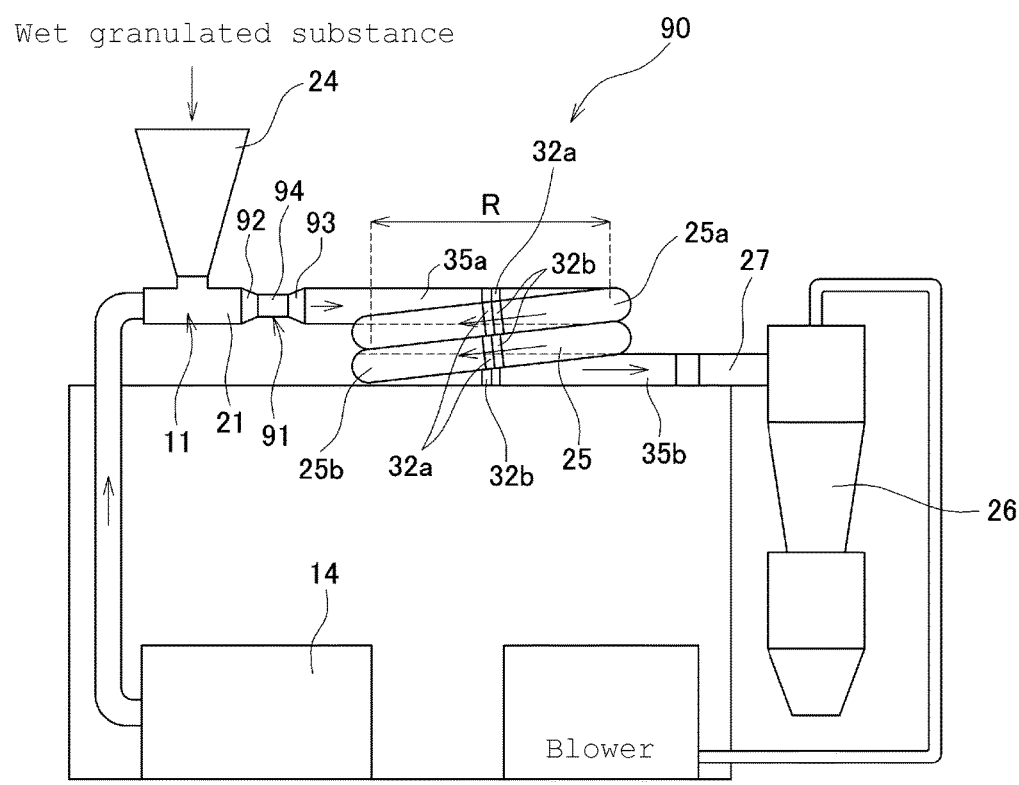

[FIG.15]
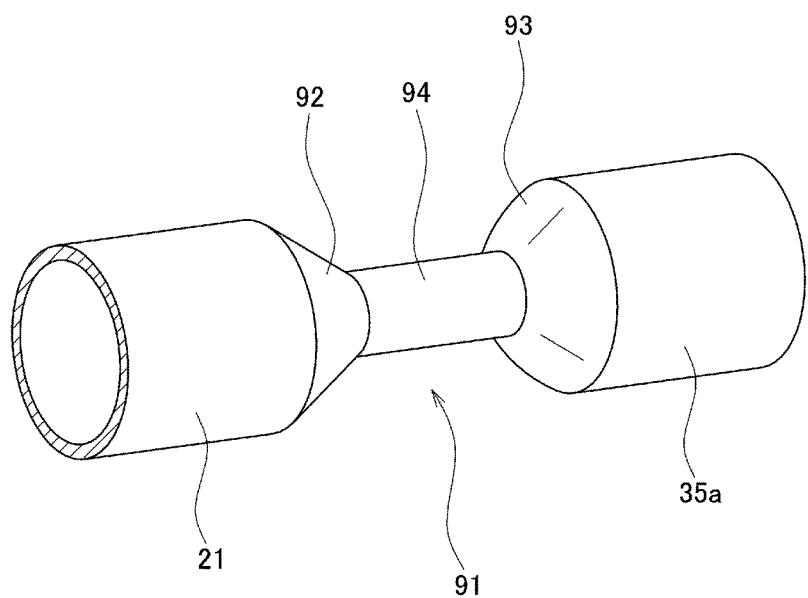

[FIG.16]
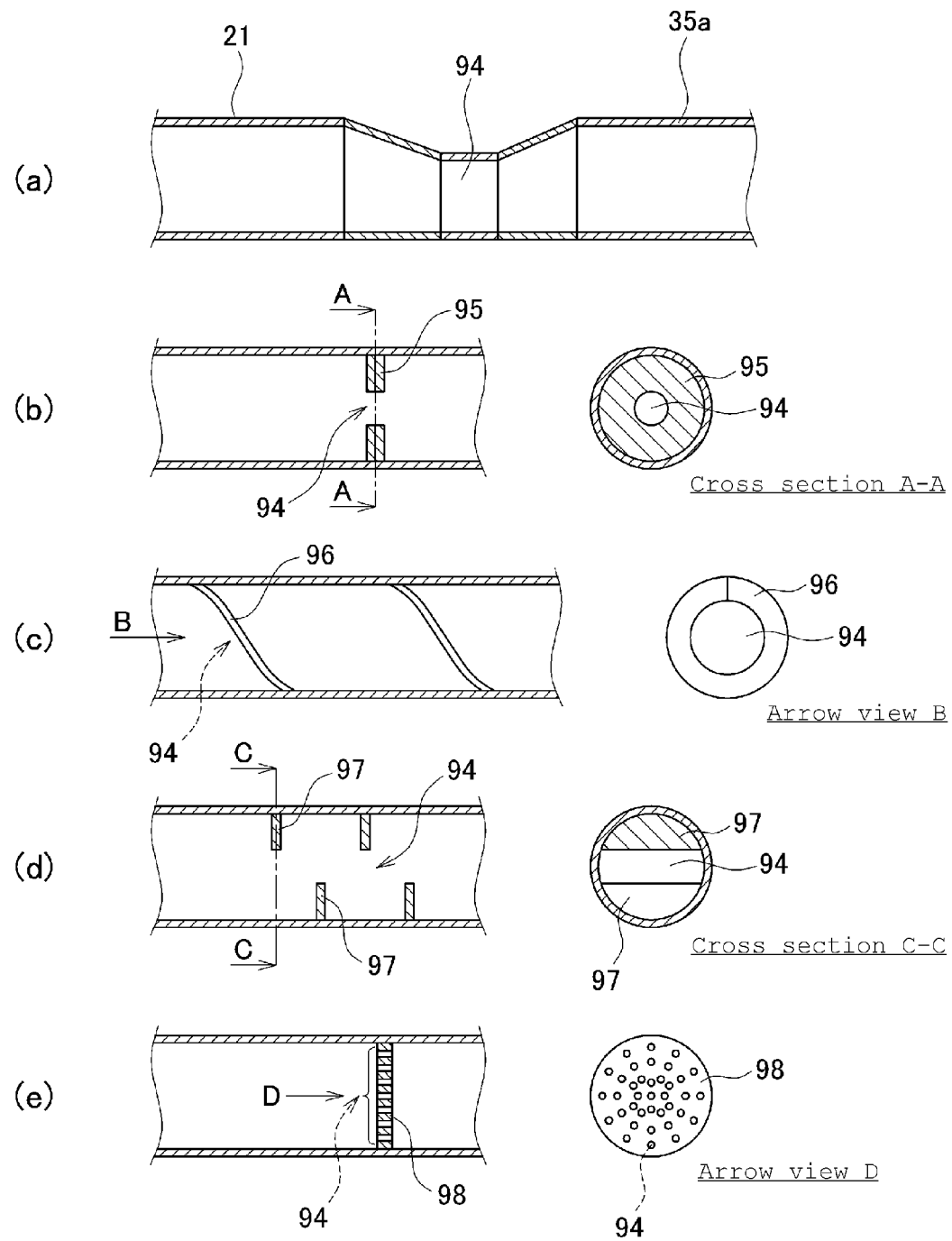

DRYING DEVICE AND CONTINUOUS GRANULE PRODUCTION SYSTEM

TECHNICAL FIELD

The present invention relates to an airflow drying device designed to continuously dry powder particles, and particularly to a drying device suitable for a system that continuously produces granular powder particles to be used as medicines.

BACKGROUND ART

In the fields of medicines and the like, granules that are made by drying wet granulated substance produced by extrusion granulators or high-speed stirring granulators, and tablets that are made from the granules are frequently used. To dry the wet granulated substance, fluidized-bed drying devices have been used: granulated substances made by granulators undergo a batch drying process to generate desired granules. However, such a batch-type drying device cannot perform a continuous process. This is why drying devices that continuously dry granulated substances by rotary feeders and the like have been proposed as disclosed in Patent Documents 1 and 2.

As disclosed in Patent Document 3, spray dryers (spray drying devices), too, could be used to produce granules. The spray dryers use a spray unit having a nozzle, rotating disk, or the like to spray slurry, which includes such as raw-material powder, solvents, and binders, and have the slurry instantaneously dried with hot air to generate granules. Meanwhile, in order to dry sludge or any other kind of waste as well as toner particles, loop-type airflow dryers may be used, as disclosed in Patent Documents 4 to 6. The airflow dryers have a vertical loop pipe into which granulated substances are poured along with a large volume of hot air; the granulated substances are circulated in the loop pipe and dried.

PRIOR ART DOCUMENTS

Patent Documents

[Patent Document 1] Jpn. Pat. Appln. Publication No. 58-72868
[Patent Document 2] Jpn. Pat. Appln. Publication No. 61-3986
[Patent Document 3] Jpn. Pat. Appln. Publication No. 2011-33269
[Patent Document 4] Jpn. Pat. Appln. Publication No. 2010-266179
[Patent Document 5] Jpn. Pat. Appln. Publication No. 2000-290671
[Patent Document 6] Jpn. Pat. Appln. Publication No. 2000-304439
[Patent Document 7] WO2008/104923
[Patent Document 8] WO2010/128359
[Patent Document 9] Jpn. UM Appln. Publication No. 61-173809
[Patent Document 10] Jpn. Pat. Appln. Publication No. 2001-132712
[Patent Document 11] Jpn. Pat. Appln. Publication No. 2000-317288
[Patent Document 12] Jpn. Pat. Appln. Publication No. 2014-25506
[Patent Document 13] Jpn. Pat. Appln. Publication No. 10-17147

Problems to be Solved by the Invention

While the continuous fluidized-bed drying devices, such as those disclosed in Patent Documents 1 and 2, are able to carry out a continuous process, it takes a long time to dry, and it is difficult to make a product with a certain level of dry conditions. Another problem is that the configuration of the device is large, requiring enormous equipment costs. Meanwhile, the spray dryers are suitable for drying liquid substances that are fluid. However, the spray dryers are not suitable for drying solid or semi-solid substances with a small water content. The loop-type airflow dryers have a loop pipe that is vertically disposed with a vertical portion. Therefore, to-be-processed substances are deposited at the bottom of the vertical portion. The problem is that this requires a larger volume of air or an increase in wind pressure, and granulated substances are turned into powder (or original powder) as a result.

SUMMARY OF THE INVENTION

Means for Solving the Problems

An airflow drying device of the present invention that dries wet granulated substances with hot air includes: a granulated substance introduction portion that includes a granulated substance inlet, into which the granulated substances are put, and a hot air inlet, through which the hot air is supplied; a dry process portion that is provided in such a way as to follow the granulated substance introduction portion and to communicate with the granulated substance introduction portion and through which the granulated substances flow together with the hot air; and a product ejection portion that is provided in such a way as to follow the dry process portion and to communicate with the dry process portion and from which the granulated substances are discharged together with the hot air after passing through the dry process portion. The dry process portion includes a processing pipe that is a tubular member having a curved portion, and the processing pipe is arranged laterally in the horizontal direction or is arranged with an inclination of 45 degrees or less to horizontal direction.

The processing pipe may be formed by winding the tubular member once or more times (e.g., twice), or may be formed into a spiral shape by winding the tubular member. The processing pipe may be divided into a plurality of processing pipe units. The processing pipe unit may include a connection portion that can be connected to another processing pipe unit in an air-tight manner, and the processing pipe unit may be connected together through the connection portion in such a way as to be able to turn.

The processing pipe may be formed into an annular shape and be arranged laterally in the horizontal direction, and be spirally disposed in an up-down direction in a communicating state. Between the upper and lower processing pipes, a joint portion may be provided to position the upper side processing pipe and to support it above the lower side processing pipe, and the joint portion may include a first joint member, which is provided on the upper portion of the processing pipe, and a second joint member, which is provided on the lower portion of the processing pipe and can be attached to or detached from the first joint member.

The joint portion may include a fitting joint and a guide joint. In the fitting joint, the first and second joint members are fitted together in the up-down direction through concave and convex portions. The guide joint allows the first and second joint members to be fitted together in the up-down direction through concave and convex portions while including a guide portion where the first and second joint members can move relative to the horizontal direction.

The fitting joint may include a joint protrusion, which is provided on either the first or second joint member, and a fitting hole, which is provided on the other and into which the joint protrusion is inserted. The guide joint may include a joint protrusion, which is provided on either the first or second joint member, a fitting hole, which is provided on the other, and a guide groove, which is formed in such a way as to communicate with the fitting hole and extend in a radial direction. The joint protrusion is guided by the guide groove in the horizontal direction when being inserted into the fitting hole.

The processing pipe maybe made by connecting semicircular processing pipe units; the processing pipe units each may include a connection portion to connect to another processing pipe unit in an air-tight manner. In this case, the connection portion includes a first sealed portion, which has a seal member that is to be pressed against in a radial direction, and a second sealed portion, which has a seal member that is to be pressed against in an axis direction. The joint portion may be positioned in such a way that the second sealed portion is being pressed against in the axis direction when the first joint member is connected to the second joint member, thereby bringing about an air-tight state.

The drying device in which an annularly-formed processing pipe is arranged laterally in the horizontal direction may further include a to-be-processed substance dispersion mechanism. The to-be-processed substance dispersion mechanism is disposed between the granulated substance introduction portion and the dry process portion and includes a small cross section portion whose cross section is smaller than that of the granulated substance introduction portion or dry process portion. The to-be-processed substance dispersion mechanism may include an introduction portion, which is connected to the to-be-processed substance introduction portion, and a feeding portion, which is connected to the dry process portion, and the small cross section portion may be disposed between the introduction portion and the feeding portion. The introduction portion may communicate with the small cross section portion in such a way as to become gradually smaller in diameter with respect to the granulated substance introduction portion, and the feeding portion may communicate with the dry process portion in such a way as to become gradually larger in diameter with respect to the small cross section portion. In the drying device having the to-be-processed substance dispersion mechanism, the granulated substances are increased in speed in the introduction portion when being introduced from the granulated substance introduction portion into the small cross section portion, and the granulated substances are dispersed in the radial direction in the feeding portion when being sent from the small cross section portion into the dry process portion.

A continuous granule production system of the present invention includes the above-described drying device, and includes a powder mixing step, a powder kneading step, a wet granulation step, a drying step by the drying device, and a powder particle collection step, and the steps are connected in that order.

Advantages of the Invention

In the case of the drying device of the present invention, the airflow drying device that dries wet granulated substances with hot air includes: the granulated substance introduction portion, which includes the granulated substance inlet and the hot air inlet; the dry process portion, through which the granulated substances flow together with the hot air; and the product ejection portion, through which the granulated substances are discharged along with the hot air. In the dry process portion, the processing pipe, which is an annularly-formed tubular member, is arranged laterally in the horizontal direction or is arranged with an inclination of 45 degrees or less with respect to the horizontal direction. Therefore, it is possible to maintain a high level of drying capability of the loop-type dryer and to suppress its crushing capability. Accordingly, it is possible to realize a high-speed, highly-efficient drying process, as well as to produce high-quality dried granules with an excellent particle size distribution and yield.

By using the drying device of the present invention and connecting the powder mixing step, the powder kneading step, the wet granulation step, the drying step, and the powder particle collection step in this order, it is possible to build the continuous granule production system that includes the drying device.

Furthermore, what is provided is the joint portion that includes the first joint member, which is provided on the upper portion of the processing pipe, and the second joint member, which is provided on the lower portion of the processing pipe and can be attached to or detached from the first joint member. The joint portion is designed to position and support the upper and lower processing pipes that are spirally disposed. Accordingly, it is possible to easily and reliably install or disassemble the processing pipe.

Furthermore, between the to-be-processed substance introduction portion and dry process portion of the airflow drying device, the dispersion mechanism is provided that includes a small cross section portion whose cross section is smaller than that of the to-be-processed substance introduction portion and dry process portion. As a result, the to-be-processed substances spread across the inner portion of the dry process portion's pipe, and the drying process can be carried out in an efficient manner.

BRIEF DESCRIPTION OF THE DRAWINGS

FIG. 1 is an explanatory diagram showing the overall configuration of a continuous granule production system in which a drying device is used, according to a first embodiment of the present invention.

FIG. 2 is an explanatory diagram showing the configuration of the drying device according to the first embodiment of the present invention.

FIG. 3 is an explanatory diagram showing the configuration of a loop pipe.

FIG. 4 is an explanatory diagram showing an example of another loop pipe.

FIG. 5 is an explanatory diagram showing an example of another loop pipe.

FIG. 6 is an explanatory diagram showing a modified example of how a loop pipe is wound.

FIG. 7 is an explanatory diagram showing a modified example in which a loop pipe is disposed in such a way as to be tilted.

FIG. 8 is an explanatory diagram showing the configuration of a drying device according to a second embodiment of the present invention.

FIG. 9 is an explanatory showing the configuration of a loop pipe.

FIG. 10 is a perspective view of the drying device configuration in which two stages of loop pipe are stacked.

FIG. 11 is an explanatory diagram showing a process of forming a lower stage of loop pipe.

FIG. 12 is an explanatory diagram showing a process of forming an upper stage of loop pipe.

FIG. 13 is an explanatory diagram showing the configuration of a joint portion: FIG. 13A shows the configuration of a fitting joint, and FIG. 13B shows the configuration of a guide joint.

FIG. 14 is an explanatory diagram showing the configuration of a drying device that includes a mechanism for dispersing to-be-processed substances, according to a third embodiment of the present invention.

FIG. 15 is an explanatory diagram showing the configuration of a to-be-processed substance dispersion mechanism.

FIG. 16 is an explanatory diagram showing a modified example of the dispersion mechanism.

BEST MODE FOR CARRYING OUT THE INVENTION (First Embodiment)

Hereinafter, embodiments of the present invention will be described. FIG. 1 is an explanatory diagram showing the overall configuration of a continuous granule production system in which a drying device 1 is used, according to a first embodiment of the present invention. The object of the present embodiment is to provide an airflow drying device that can perform a high-efficient drying process that yields high-quality dried granules (in terms of particle size distribution and yield) without turning granulated substances into powder. As shown in FIG. 1, the continuous granule production system that uses the drying device 1 of the present invention includes a wet granulation process and a drying process. The granules produced by the system undergo a sifting/particle size regulation process, then they are turned into products as granules or turned into products as tablets after being tableted by tableting machines and coated by coating machines.

The wet granulation process can employ various well-known wet granulators. For example, in the wet granulation process, a high-speed stirring granulator 2 and an extrusion granulator 3 are used. The granulated substances produced by the wet granulation process are quantitatively fed to the drying device 1 by a wet granulated substance continuous feeding device 4. The high-speed stirring granulator 2 doubles as a powder mixing device and a powder kneading device. The granulator 2 pours raw materials into a vessel and stirs and kneads the raw materials inside the vessel by rotating an agitator or a chopper at high speed. The extrusion granulator 3 is a wet granulation device equipped with a screw shaft (e.g., two-axis parallel configuration). The granulator 3 turns raw materials into columnar wet granulated substances by compressing and kneading the raw materials with screw and appropriately adding water.

Incidentally, the above-described configuration of the high-speed stirring granulator 2, extrusion granulator 3, and other parts are just one example. These devices can be replaced with other various devices that have the stirring, granulation, and particle size-regulation functions, regardless of the configuration and operation mode. Furthermore, depending on the state of granulated substances and product specifications, a particle size regulating device (not shown) may be added, or the wet granulated substance continuous feeding device 4 may be omitted.

FIG. 2 is an explanatory diagram showing the configuration of the drying device 1 shown in FIG. 1. As shown in FIG. 1, the drying device 1 generally includes a granulated substance introduction portion (to-be-processed introduction portion) 11, a dry process portion 12, and a product ejection portion 13. The drying device 1 is an airflow continuous drying device: a loop pipe, which has been arranged vertically along the vertical direction in the case of a conventional technique, is arranged laterally in the horizontal direction along the horizontal direction (In FIG. 1, the dry process portion 12 of the drying device 1 is seen from above). As a result, it is possible to make use of a high drying capability of a conventional loop-type airflow drying machine while suppressing the granulated-substance grinding capability, which was a major obstacle to the granule production. The use of the drying device 1 makes it possible to conduct a continuous drying process on wet granulated substances, without using large-size equipment.

The granulated substance introduction portion 11 is formed as a stainless steel pipe 21 that is about 50 mm in outer diameter and about 2 mm to 3 mm in thickness. On the stainless steel pipe 21, a granulated substance inlet 22 and a hot air inlet 23 are provided. Into the granulated substance inlet 22, wet granulated substances, or to-be-processed substances of the drying device 1, are input. Into the hot air inlet 23, a high-pressure hot air (processing gas) with a wind speed of about 10 to 20 m/s is supplied. On the granulated substance inlet 22, a hopper 24 is attached. Into the hopper 24, wet granulated substances are supplied from the wet granulated substance continuous feeding device 4. The hot air inlet 23, which is followed by the granulated substance inlet 22, is connected to a hot air feeding device 14.

The dry process portion 12 comes after the granulated substance introduction portion 11. The dry process portion 12 includes a structure in which a loop pipe (processing pipe) 25, which is made of metal (e.g., stainless steel), is spirally disposed. The loop pipe 25 is a tubular member that is circular in cross section and is about 75 mm in outer diameter and about 2 mm to 3 mm in thickness. One end of the loop pipe 25 is connected to the stainless steel pipe 21 via a straight pipe part 35a. To the other end of the loop pipe 25, a straight pipe part 35b is connected. The straight pipe part 35b is connected to the product ejection portion 13 via a connection pipe 27. The loop pipe 25 is larger in diameter than the stainless steel pipe 21 of the granulated substance introduction portion 11.

The loop pipe 25 is wound along the horizontal direction. Winding diameter R (or diameter of a circle passing through center O of the loop pipe) of the loop pipe 25 is about 700 mm. In this case, two stages (two turns) of the loop pipe 25 are disposed in such a way as to be arranged laterally (or be laid on its side). The first stage 25a (referred to as loop pipe upper stage 25a) of the loop pipe 25 is horizontally placed. The first stage 25a communicates with the second stage 25b (referred to as loop pipe lower stage 25b) of the loop pipe 25. The two stages are stacked in such a way as to form a coil spring. If multiple stages of the loop pipe 25 are stacked, the inner portions of the loop tube 25 are inevitably inclined. According to the present invention, such a "horizontal arrangement" of the loop pipe 25 is not intended to exclude the inclination inside the loop pipe.

FIG. 3 is an explanatory diagram showing the configuration of the loop pipe 25. As shown in FIG. 3A, each stage of the loop pipe 25 is divided into two, loop pipe units (processing tube units) 31 (31a and 31b). In connection portions of the two units 31a and 31b, stainless-steel connectors 32a and 32b are mounted. On the connectors 32a and 32b, as shown in FIG. 3B, spigot-and-socket ("Inro" in Japanese) connection portions 33a and 33b are formed. The two units 31a and 31b are connected together in an air-tight manner via packing 34 through spigot-and-socket connection or ferrule joints.

The loop pipe 25 can rotate around central axis O, with the connectors 32a and 32b being connected thereto. That is, the connectors 32a and 32b are connected in such a way that both can rotate along a circumferential direction. For example, in order to install the loop pipe 25 as shown in FIG. 2, one end (31b1) of the loop pipe unit 31b is first connected to the straight pipe part 35a via a connector 32a. Then, one end (31a1) of the loop pipe unit 31a is connected to the other end (31b2) of the loop pipe unit 31b via connectors 32b and 32a. At this time, the loop pipe unit 31b is turned a predetermined angle in portions of the connectors 32a and 32b, so that the other end (31b2) of the loop pipe unit 31b comes below the one end (31b1).

After the loop pipe unit 31b is tuned a predetermined angle, the one end (31a1) of the loop pipe unit 31a is connected to the other end (31b2), thereby forming the loop pipe upper stage 25a. At this time, the connection portions (connectors 32b and 33a) of the loop pipe units 31b and 31a are appropriately turned in such a way that the other end (31a2) of the loop pipe unit 31a, or terminal portion of the loop pipe upper stage 25a, comes below the straight pipe part 35a. After the loop pipe upper stage 25a is formed, the subsequent loop pipe units 31b and 31a are connected while the connection portions of the connectors 32a and 32b are appropriately twisted. As a result, the loop pipe lower stage 25b is formed. Then, to a terminal portion of the loop pipe lower stage 25b, the straight pipe part 35b is connected via a connector 32b. In this manner, the two-stage loop pipe 25 is formed.

As described above, in the drying device 1 of the present invention, the connection portions of connectors 32a and 32b can be turned when a subsequent loop pipe unit 31 is connected. Accordingly, it is possible to easily stack multiple stages of the loop pipe 25 without twisting a body portion 36 of a loop pipe unit 31. What has been described here is the case in which the two-stage loop pipe 25 is formed. Three or more stages of the loop pipe 25 can be easily formed as well, with the use of the same method.

Since the loop pipe 25 can be divided, the inner portion of the loop pipe can be easily cleaned and visibly checked. Furthermore, each of the stages is divided, and any number of stages of the loop pipe 25 can be stacked. Therefore, depending on the specifications of granulated products, the configuration of the loop pipe 25 can be easily changed. Incidentally, the number of portions into which the loop pipe 25 is divided is not limited to two. For example, the loop pipe 25 may be divided into four or more portions, making the cleaning and visual-check work easier.

The product ejection portion 13 follows the dry process portion 12, and includes a cyclone collector (powder particle collecting device) 26. The cyclone collector 26 is connected to an end of the loop pipe 25 via a connection pipe 27. After being dried by the dry process portion 12, the granulated substances are collected by a product collecting pipe of the cyclone collector 26. The cyclone collector 26 is connected to a particle size regulation device (not shown) that follows, which carries out a sifting/particle size regulation process.

In the drying device 1, the process of drying granulated substances is carried out as follows. In the drying device 1, wet granulated substances are fed to the granulated substance inlet 22 from the wet granulated substance continuous feeding device 4. At this time, the pressure inside the stainless steel pipe 21 of the granulated substance introduction portion 11 is negative due to a suction force by the cyclone collector 26. Accordingly, the granulated substances that are fed into the hopper 24 from the wet granulated substance continuous feeding device 4 is introduced into the granulated substance inlet 22 without being blown up. Meanwhile, into the hot air inlet 23, a high-pressure hot air (e.g., 90 degrees/10 to 20 m/s) is supplied from the hot air feeding device 14. The granulated substances that have been fed into the stainless steel pipe 21 are carried away by the hot air to the dry process portion 12's side.

As described above, the diameter of the loop pipe 25 is larger than that of the stainless steel pipe 21 of the granulated substance introduction portion 11. Therefore, as for the hot air supplied from the hot air inlet 23, the speed of the hot air near the granulated substance inlet 22 is higher than in the loop pipe 25. Accordingly in the granulated substance introduction portion 11, the granulated substances that have been supplied from the granulated substance inlet 22 are smoothly introduced into the loop pipe 25 via the stainless steel pipe 21, without staying around the granulated substance inlet 22.

After being carried to the dry process portion 12's side, the granulated substances flow through the loop pipe 25 along with the hot air, and are dried. In this drying device 1, it takes about one to two seconds for the granulated substances to pass through the loop pipe 25. After being dried, the granulated substances are discharged from the loop pipe 25 along with the hot air, and are collected by the cyclone collector 26 via the connection pipe 27.

In this case, the granulated substances are fed to the drying device 1 after the particle sizes of the granulated substances are regulated to some extent. Therefore, it is not preferred that the granulated substances be crushed inside the drying device 1. As described above, in the conventional loop-type airflow drying device, the loop pipe is vertically installed. Therefore, the granulated substances need to be lifted against gravitational force. Therefore, the process requires a large volume of air. Moreover, the conventional drying device is designed to eject, out of the device, granulated substances that have become lightweight after being dried, and makes use of gravitational force to let undried granulated substances fall. Therefore, the granulated substances go up and down while circulating many times inside the loop pipe under the influence of a large volume of air. As a result, in the conventional drying device, the granulated substances are likely to be crushed. This is because the conventional drying device is originally designed to handle the granulated substances that are allowed or required to be crushed at the time of drying, such as sludge or toner particles. The conventional drying device is not expected to handle granules that should not be crushed at the time of drying. Meanwhile, since the granulated substances being fed to the drying device 1 could contain coarse granules, the drying device has been required to do some kind of particle-size regulation during the drying.

In the drying device 1 of the present invention, while flowing through the loop pipe 25, the granulated substances are receiving a centrifugal force and being dried by hot air. At this time, the volume of air supplied to the loop pipe 25 is kept as low as possible without causing the granulated substances to stay inside the pipe. Therefore, unlike the conventional vertical loop pipe, a large impact is not imposed on the granulated substances by a large amount of air or a gravitational fall; the wet granulated substances would remain granules when being dried, without being crushed or turned into powder. Through experiments, the inventors confirmed that the granulated substances that were collected after the process contained almost no fine powder, proving that the crushing capability was effectively reduced.

In this manner, the drying device 1 of the present invention can reduce its crushing capability while maintaining a high level of drying performance by a loop-type drying device. Accordingly, while realizing a high-speed, efficient drying process, it is possible to obtain high-quality dried granules with an excellent particle-size distribution and yield. Moreover, the drying device 1 includes the loop pipe 25 that is wound. Therefore, it is possible to provide a highly-efficient, compact drying device that is high in the efficiency of how the space is utilized. Through experiments, the inventors found that a drying process involving a straightened loop pipe 25 with the same amount of air causes granulated substances to stay in the pipe, and that the processing efficiency is not good despite the fact that a larger space is required.

By combining the drying device 1 with such machines as a continuous granulation device, tableting machine, and coating machine, it is possible to build a continuous granule production system that includes the drying process, as shown in FIG. 1. Incidentally, as described above, devices that are to be combined with the drying device 1 can be appropriately selected or replaced depending on how powder particles are being processed, such as a particle size regulation machine in the sifting/particle size regulation process, tablet machine, and coating machine, including a wet granulation process. The continuous granule production system of the present invention is not limited to the above combination of devices.

Meanwhile, in the above-described drying device 1, the granulated substances are fed from the upper stage's side of the loop pipe 25 and are discharged from the lower stage's side during the drying process. Instead, the granulated substances may be fed from the lower stage's side and be discharged from the upper stage's side. The inclination angle between the adjacent upper and lower stages of the loop pipe 25 is about 10 degrees; a volume of air required to lift the granulated substances from the lower stage to the upper stage against gravitational force is almost the same as that required to carry the granulated substances from the upper stage to the lower stage. Moreover, the granulated-substance crushing capability is not affected. If the device is designed to carry the granulated substances from the lower stage's side to the upper stage's side, the device can be made smaller in size with an improvement in the efficiency of how the space is utilized.

In the above-described embodiment, as the loop pipe 25, a tubular member that is circular in cross section is used. Instead, as shown in FIG. 4A, a flat loop pipe 41 that is elliptical in cross section may be used; or, as shown in FIG. 4B, in order to improve the drying efficiency, a loop pipe 43 with a protrusion 42 provided on the inner surface may be used. However, in this case, if the protrusion 42 is large, there is a possibility that the granulated substances could break after a collision with the protrusion 42. It is preferred that gradual ups and downs be continuously formed.

As the loop pipe, as shown in FIG. 5A, a loop pipe 44 that is almost triangular in cross section may be used. In this case, the loop pipe 44 has a one-turn structure as shown in FIG. 5B. After getting into the loop pipe 44, the granulated substances flow along a slope portion 45 at the inner periphery of the loop pipe. Since wet granulated substances are large in mass, the wet granulated substances flow in a lower portion of the slope portion 45. As the amount of moisture gradually reduces during the drying process, the granulated substances start to flow in an upper portion of the slope portion 45. In an upper portion of the slope portion 45 of the loop pipe 44, a discharge opening 46 is provided. After being dried and becoming lightweight, the granulated substances go up the slope portion 45. After reaching the height of the discharge opening 46, the granulated substances are forced out of the loop tube 44 via the discharge opening 46. That is, the granulated substances are appropriately discharged from the discharge opening 46 after undergoing the drying process.

Moreover, as for the winding form of the loop pipe, besides the above-described stack type, a spiral winding form (loop pipe 47) is available as shown in FIG. 6. According to the winding form shown in FIG. 6, the up-down-direction thickness of the drying device can be made smaller, and the device can be made compact. In this case, the feeding or discharging of granulated substances may be conducted from either the inner side or the outer side.

In the above-described embodiment, the first stage (bottom stage) of the loop pipe 25 is laid horizontally. Instead, as shown in FIG. 7, the loop pipe 25 may be tilted at an angle of $\theta$ with respect to the horizontal plane. The inclination of the loop pipe 25 results in a drop in the area occupied by the loop pipe; the device can be therefore made smaller in size. However, the greater the inclination angle $\theta$ becomes, the larger the volume of air is required to be than the horizontal state ($\theta=0$ degree) to avoid an accumulation of granulated substances in the loop pipe. As the volume of air is increased, the possibility goes higher that the granulated substances are crushed inside the loop pipe. Through experiments, the inventors found that $\theta$ should be about up to 45 degrees, given the drying performance and the crushing rate. Therefore, in terms of the drying process, it is preferred that the loop pipe be arranged horizontally with $\theta=0$.

(Second Embodiment)

An airflow drying device of a second embodiment of the present invention will be described. Incidentally, the portions and members that are the same as, or similar to, those of the first embodiment are represented by the same reference symbols, and will not be described repeatedly. In the above-described drying device 1, in order to allow a user to clean or visually inspect the inner portion of the loop pipe 25, each stage of the loop pipe 25 is divided into two or more. For example, if three stages of a loop pipe that are formed in such a way as to be divided into semicircular portions are stacked, the processing pipe turns out to have seven joint portions (including the inlet and outlet of the loop pipe). The joint portions need to be hermetically sealed so that the flow of air does not leak. Meanwhile, the pipe needs to be easily disassembled for cleaning or the like. That is, the joint portions of the loop tube have to satisfy two requirements such as to be easily attached or detached, as well as to be hermetically sealed when being attached.

In a drying device that uses a loop pipe, if a plurality of stages of the loop pipe are stacked, the upper and lower stages of the loop pipe need to be firmly fixed without shifting from their original locations. Even in the case of the multiple-stage structure, the loop pipe must be easily installed or disassembled, including such operations as attaching or detaching the joint portions; and a structure is required to reliably and stably support the upper and lower stages of the loop pipe. The object of the present embodiment is to provide a processing pipe installation structure in which a processing pipe can be easily and reliably installed or disassembled in a drying device that includes the annular processing pipe that is arranged laterally in the horizontal direction.

FIG. 8 is an explanatory diagram showing the configuration of a drying device 50 according to the second embodiment of the present invention. As shown in FIG. 8, even in the drying device 50, a loop pipe upper stage 25a communicates with a loop pipe lower stage 25b and is disposed on the loop pipe lower stage 25b in such a way as to form a coil spring. The loop pipe lower stage 25b is supported by support legs 58 on a housing 59. The loop pipe upper stage 25a is placed on the loop pipe lower stage 25b via joint portions 57 (fitting joint 61 and guide joint 62).

FIG. 9 is an explanatory diagram showing the configuration of the loop pipe 25. As shown in FIG. 9A, each stage of the loop pipe 25 is divided into two; semicircular loop pipe units (processing pipe units) 51 are connected together. A loop pipe unit 51 includes a semicircular curved pipe portion 63 and straight connection portions 64. To the connection portions 64, stainless-steel connectors 52a and 52b are attached. On the connectors 52a and 52b, spigot-and-socket connection portions 53a and 53b are formed. The loop pipe units 51 are connected together in an air-tight manner via packings 54a and 54b.

FIG. 9B is an explanatory diagram showing the configuration of the connectors 52a and 52b. As shown in FIG. 9B, on the connector 52b, an outer tube portion 65 and an inner tube portion 66 are provided. The outer tube portion 65 and the inner tube portion 66 are concentrically provided with respect to central axis O (or center of the loop pipe). The inner tube portion 66 is provided in such a way as to protrude along the axis direction at the center of the outer tube portion 65. Between the inner tube portion 66 and the outer tube portion 65, a fitting grove 68 is formed across the circumference. Into the fitting groove 68, a tip portion 67 of the connector 52a is inserted. Around the outer periphery of the inner tube portion 66, a ring-shaped packing 54a is fitted. In the innermost portion of the fitting groove 68, a ring-shaped packing 54b is mounted as well.

FIG. 9C is an explanatory diagram showing how the connectors 52a and 52b are being connected. As shown in FIG. 9C, the connectors 52a and 52b are connected together as the tip portion 67 of the connector 52a is inserted into the fitting groove 68 of the connector 52b. At this time, the packing 54a presses an inner peripheral surface 67a of the connector tip portion 67, thereby forming a first sealed portion 69. The packing 54b presses a tip surface 67b of the connector tip portion 67, thereby forming a second sealed portion 71. The drying device 50 adopts a double seal structure through which the loop pipe units 51 are connected together in an air-tight manner with the packings 54a and 54b. The loop pipe 25 can rotate around the central axis O, with the connectors 52a and 52b being connected. The connectors 52a and 52b are connected in such a way as to be able to rotate in the circumferential direction.

FIG. 10 is a perspective view showing the configuration of the drying device 50 in which two stages of the loop pipe 25 are stacked. FIG. 11 is an explanatory diagram showing how the loop pipe lower stage 25b is formed. FIG. 12 is an explanatory diagram showing how the loop pipe upper stage 25a is formed. In the drying device 50, stages of the loop pipe 25 are sequentially stacked from the bottom. In order to first form the loop pipe lower stage 25b, to a straight pipe part 55b, a first lower stage loop pipe unit 51p is connected (FIG. 11A). In the drying device 50, one end of the straight pipe part 55b is fixed and supported by fitting joints 72a and 72b on the housing 59. The other end of the straight pipe part 55b is provided with a connector 52b. The straight pipe part 55b and the loop pipe unit 51p are connected by the connector 52b and a connector 52a of the one end (51a) of a loop pipe unit 51. The loop pipe unit 51p that is connected to the straight pipe part 55b is supported by support legs 58a to 58c and is placed on the housing 59. The height of the support legs 58a and 58c is gradually increased in this order. The loop pipe unit 51p is mounted on the support legs 58a to 58c after being appropriately turned at the connection portion with the straight pipe part 55b.

After the loop pipe unit 51p is mounted on the support leg 58b, the connector tip surface 67b on the loop pipe unit 51p's side is pressed against the packing 54b on the straight pipe part 55b's side. That is, the support leg 58b is disposed at a dimensional position where the tip surface 67b is pressed against the packing 54b. As the spigot-and-socket connection portions 53a and 53b are fitted together, the packing 54a of the connector 52b is pressed against the tip portion inner peripheral surface 67a of the connector 52a. In this manner, the straight pipe part 55b and the loop pipe unit 51 (51p) are connected together in an air-tight manner, forming a half of the loop pipe lower stage 25b. In the drying device 50, the pressure inside the loop pipe 25 is supposed to be negative. Therefore, even if fastening brackets or the like are not used, it is possible to keep the connectors 52a and 52b closely connected because of a double seal structure realized by the packings 54a and 54b, without causing any practical problems.

After the lower-stage first-half loop pipe unit 51p is attached to the straight pipe part 55b, a next loop pipe unit 51 (51q) is connected to the other end (51b) of the loop pipe unit 51 in order to form a remaining half of the loop pipe lower stage 25b (FIG. 11B). To the end portion (51b) of the loop pipe unit 51 (51p), one end (51a) of the loop pipe unit 51 (51q) is connected via connectors 52b and 52a in such a way that the front-back direction of the loop pipe unit 51 is opposite to that of the lower-stage first-half. As in the case of the previously connected loop pipe unit 51p, the loop pipe unit 51q is supported by support legs 58d to 58f. The height of the support legs 58d to 58f similarly becomes higher in this order. The lower-stage second-half loop pipe unit 5q, too, is mounted on the support legs 58d to 58f after being appropriately turned at the connection portion with the lower-stage first-half loop pipe unit 51p. The support legs 58d and 58c are designed to support both sides of the unit connection portion, and are the same in height.

After the loop pipe unit 51 is mounted on the support leg 58e, the connector tip surface 67b on the lower-stage second-half loop pipe unit 51q's side is pressed against the packing 54b on the lower-stage first-half loop pipe unit 51p's side. The support leg 58e is disposed at a dimensional position where the tip surface 67b is pressed against the packing 54b. As the spigot-and-socket connection portions 53a and 53b are fitted together, the packing 54a of the connector 52b is pressed against the tip portion inner peripheral surface 67a of the connector 52a. In this manner, the lower-stage first-half loop pipe unit 51p and the lower-stage second-half loop pipe unit 51q are connected together in an air-tight manner, thereby forming the loop pipe lower stage 25b. The end portion (51b) of the lower-stage second-half loop pipe unit 51q is supported by the support leg 58f, and is disposed above the connection portion of the straight pipe part 55b and lower-stage first-half loop pipe unit 51p.

After the loop pipe lower stage 25b is formed, two loop pipe units 51 are connected by appropriately twisting the connection portions of connectors 52a and 52b. As a result, the loop pipe upper stage 25a is formed. During this process, on the loop pipe upper stage 25a, joint portions 57 are being used for the connection and positioning of the loop pipe upper stage 25a with the loop pipe lower stage 25b. The drying device 50 includes, as joint portions 57, one fitting joint 61 and two guide joints 62. The fitting joint 61 is provided at the center of the loop pipe unit 51. The guide joints 62 are provided near the connectors 52a and 52b. The three joints 61 and 62 are disposed at regular intervals.

FIG. 13A shows the configuration of the fitting joint 61, while FIG. 13B shows the configuration of the guide joint 62. As shown in FIG. 13A, the fitting joint 61 includes a convex joint 61a and a concave joint 61b. The convex joint 61a includes a convex joint body 73 and a joint protrusion 74. The joint protrusion 74 is provided at the tip of the convex joint body 73 in such a way as to protrude therefrom. The concave joint 61b includes a concave joint body 75 and a fitting hole 76. The fitting hole 76 is provided in such a way as to form a concave portion in the tip of the concave joint body 75. The fitting hole 76 is slightly larger in diameter than the joint protrusion 74. The joint protrusion 74 can be inserted and fitted into the fitting hole 76. The same is true for the configuration of fitting joints 72a and 72b of the straight pipe part 55b.

As shown in FIG. 13B, the guide joint 62 similarly includes a convex joint 62a and a concave joint 62b. The convex joint 62a includes a convex joint body 77 and a joint protrusion 78. The joint protrusion 78 is provided at the tip of the convex joint body 77 in such a way as to protrude therefrom. The concave joint 62b includes a concave joint body 79 and a fitting hole 81, which is provided in such a way as to form a concave portion in the tip of the concave joint body 79; the configuration of the concave joint body 79 and fitting hole 81 is similar to that of the fitting joint 61. However, unlike the fitting joint 61, on a tip surface 79a of the concave joint body 79, a guide groove 82 is formed in such as to extend to the fitting hole 81. The guide groove 82 is provided in such a way as to form a concave portion along the radial direction; the guide groove 82 is formed into a strip shape toward the fitting hole 81 from the outer peripheral side of the tip surface 79a. The guide groove 82 becomes deeper toward the fitting hole 81. The guide groove 82 is wider than the outer diameter of the joint protrusion 78. The joint protrusion 78 is guided by an inclined surface 82a of the guide groove 82, and is inserted and fitted into the fitting hole 81.

To form the loop pipe upper stage 25a, a loop pipe unit 51 is jointed to the second-half loop pipe unit 51q of the loop pipe lower stage 25b. That is, to the currently-opened end portion (52b) of the lower-stage second-half loop pipe unit 51q, one end (52a) of the loop pipe unit 51 (51r) is connected (FIG. 12A). During this process, on the loop pipe upper stage 25a, the joint protrusion 78 of the guide joint 62 is inserted into the guide groove 82, while the connector 52b is fitted into the connector 52a. The loop pipe unit 51r is jointed to the loop pipe unit 51q from an obliquely upward side in such a way that the joint protrusion 78 slides into the guide groove 82. The joint protrusion 74 of the fitting joint 61 is fitted into the fitting hole 76 as the joint protrusion 78 is inserted into the fitting hole 81.

The joint protrusion 78 of the guide joint 62 is fitted into the fitting hole 81, and the joint protrusion 74 of the fitting joint 61 is fitted into the fitting hole 76. As a result, the connector tip surface 67b on the upper-stage first-half loop pipe unit 51r is pressed against the packing 54b on the lower-stage second-half loop pipe unit 51q. The joint protrusion 74 and the fitting hole 76 of the fitting joint 61 are disposed at dimensional positions where the tip surface 67b is pressed against the packing 54b. As the spigot-and-socket connection portions 53a and 53b are fitted together, the packing 54a of the connector 52b is pressed against the tip portion inner peripheral surface 67a of the connector 52a. In this manner, the lower-stage second-half loop pipe unit 51q and the upper-stage first-half loop pipe unit 51r are connected together in an air-tight manner, thereby forming a half of the loop pipe upper stage 25a.

Then, to form a remaining half of the loop pipe upper stage 25a, to the end portion (51b) of the upper-stage first-half loop pipe unit 51r, via connectors 52b and 52a, one end (51a) of the upper-stage second-half loop pipe unit 51s is connected. During this process, the other end (51b) of the upper-stage second-half loop pipe unit 51s is joined to a straight pipe part 55a of the granulated substance introduction portion 11. At this time, the joint protrusion 78 of the guide joint 62 is similarly inserted into the guide groove 82, while the connector 52a is fitted into the connector 52b. As described above, the upper-stage second-half loop pipe unit 51s is connected to the upper-stage first-half loop pipe unit 51r from an obliquely upward side in such a way that the joint protrusion 78 slides into the guide groove 82. The joint protrusion 74 of the fitting joint 61 is fitted into the fitting hole 76 as the joint protrusion 78 is inserted into the fitting hole 81.

After the joint protrusion 74 is fitted into the fitting hole 76, the connector tip surface 67b on the upper-stage second-half loop pipe unit 51s' s side is pressed against the packing 54b on the upper-stage first-half loop pipe unit 51r. The joint protrusion 74 and the fitting hole 76 of the fitting joint 61 are disposed at dimensional positions where the tip surface 67b is pressed against the packing 54b. As described above, the packing 54a of the connector 52b is pressed against the tip portion inner peripheral surface 67a of the connector 52a. As a result, the upper-stage first-half loop pipe unit 51r and the upper-stage second-half loop pipe unit 51s are connected together in an air-tight manner, thereby forming the loop pipe upper stage 25a.

At the end portion of the straight pipe part 55a that is close to the granulated substance introduction portion 11, the connector 52a is provided as well. As the joint protrusion 74 is fitted into the fitting hole 76, the packing 54b of the upper-stage second-half loop pipe unit 51s is pressed against the connector tip surface 67b of the straight pipe part 55a. Moreover, the packing 54a of the connector 52b is pressed against the tip portion inner peripheral surface 67a of the connector 52a. As a result, the upper-stage second-half loop pipe unit 51s and the straight pipe part 55a are connected together in an air tight manner, and the dry process portion 12 and the granulated substance introduction portion 11 are connected as a result.

After the dry process is finished, the loop pipe 25 is disassembled in reverse order with respect to the above-described one. That is, the loop pipe unit 51 is lifted at the fitting joint 61, and the joint protrusion 74 is pulled out of the fitting hole 76 and is lifted toward an obliquely upward side. As a result, the joint protrusion 78 is moved away from the fitting hole 81, and is lifted along the guide groove 82, and the loop pipe unit 51 is removed from its counterpart. In the drying device 50, the parts are sequentially removed from the top; the loop pipe units 51 of the loop pipe upper stage 25a and loop pipe lower stage 25b are detached in this order.

In the drying device 50 that employs the above-described processing pipe installation structure, the use of the fitting joints 61 and guide joints 62 makes it easier to connect the adjacent loop pipe units 51 together in an air-tight manner without using any special fasteners. Accordingly, it is possible to easily connect the loop pipe units 51 together in an air-tight manner, and to easily stack a plurality of stages of loop pipe 25 without any special tools or fasteners. Furthermore, it is possible to disassemble the loop pipe 25 without using any special tools. Thus, the loop pipe 25 can be easily attached or detached, the man-hour required to assemble or disassemble the device can be reduced, and the cleaning can be easily conducted.

Moreover, in the drying device 50, the loop pipe unit 51 itself works as a support for the next stage, thereby forming the spiral structure. This configuration makes a portion supporting the loop tube 25 smaller. As a result, the configuration of the device is simple, and the device can be made in smaller in size. Moreover, it is possible to provide the drying device with a good appearance.

(Third Embodiment)

As a third embodiment, a drying device that includes a dispersion mechanism 91 for to-be-processed substances will be described. In the airflow drying device of the first embodiment, the dried air is flowing through the annular processing pipe; the wet to-be-processed substances are dried while traveling inside the pipe together with the dried air. However, the to-be-processed substances inside the pipe move along the outer side of the pipe because of centrifugal force. As a result, a flow of dried air close to the inner side of the processing pipe is not utilized for drying the to-be-processed substances. That is, inside the processing pipe, there is a flow of air that is not utilized for carrying and drying the to-be-processed substances and which is just passing nearby. This flow of passing air should be utilized in order to improve the processing efficiency. The object of the present embodiment is to provide a to-be-processed substance dispersion mechanism that disperses the to-be-processed substances across the inner portion of the pipe so that the drying device with a horizontally-arranged annular processing pipe can carry out the drying process in an efficient manner.

FIG. 14 is an explanatory diagram showing the configuration of a drying device 90 according to a third embodiment of the present invention. As shown in FIG. 14, between the granulated substance introduction portion 11 and the dry process portion 12, a dispersion mechanism 91 is inserted. The dispersion mechanism 91 is disposed at an early stage of the drying device 1 in order to efficiently disperse and supply, to the loop pipe 25, the granulated substances (to-be-processed substances) that are fed from the wet granulation process. FIG. 15 is an explanatory diagram showing the configuration of the dispersion mechanism 91. The dispersion mechanism 91 is placed between the stainless steel pipe 21 of the granulated substance introduction portion 11 and the straight pipe part 35*a* of the dry process portion 12. The dispersion mechanism 91 employs a so-called reducer, or a pipe whose diameter becomes wider after being narrowed once. The reducer includes an introduction portion 92, which is connected to the stainless steel pipe 21; a feeding portion 93, which is connected to the straight pipe part 35*a*; and a small cross section portion 94, which is placed between the introduction portion 92 and the feeding portion 93. The introduction portion 92 is a truncated-cone tapered pipe whose diameter becomes gradually smaller from the stainless steel pipe 21. The feeding portion 93 is also a truncated-cone tapered pipe whose diameter becomes gradually larger from the small cross section portion 94. The small cross section portion 94 has an inner diameter that is smaller than that of the stainless steel pipe 21 (at 30 mm, for example, about two-thirds thereof) and a length of about 100 mm.

Into the dispersion mechanism 91, the granulated substances are supplied from the granulated substance introduction portion 11 along with hot air. The granulated substances that are supplied into the dispersion mechanism 91 pass through the introduction portion 92 and the small cross section portion 94, and reach the feeding portion 93. Then, the granulated substances are fed to the straight pipe part 35*a*. During this process, because of a difference in cross section (inner diameter) between the introduction portion 92 and the small cross section portion 94, the speed of the granulated substances, as well as that of the hot air, increases, when the granulated substances pass through the small cross section portion 94 to the feeding portion 93. The feeding portion 93 becomes larger in diameter, unlike the introduction portion 92. Therefore, the granulated substances carried together with the hot air spread inside the pipe, and the granulated substances are fed into the straight pipe part 35*a*. In this manner, the granulated substances spread inside the pipe together with the hot air and are supplied into the loop pipe 25. The granulated substances inside the loop pipe 25 tend to travel near the outer side of the pipe due to centrifugal force. Even so, most of the granulated substances are unlikely to travel along the outer side of the pipe because the granulated substances have been spread across the inner portion of the pipe at the inlet of the loop pipe 25. As a result, a flow of passing air that is not utilized for carrying or drying the granulated substances is unlikely to occur on the inner side of the processing pipe, contributing to an improvement in the efficiency of the drying process.

In the drying device 90, the dispersion mechanism 91 having the small cross section portion 94 is disposed between the loop pipe 25 and the stainless steel pipe 21. The hot air being supplied from the hot air inlet 23 is once increased in speed at the dispersion mechanism 91, then it is dispersed inside the loop pipe 25. The granulated substances are dispersed across the inner portion of the pipe by the dispersion mechanism 91, and they are carried toward the dry process portion 12. The granulated substances flow through the loop pipe 25 along with the hot air and are being dried. The amount of air being supplied to the loop pipe 25 is kept at a minimum level that prevents an accumulation of granulated substances in the pipe. However, the drying device 90 has the dispersion mechanism 91 ahead of the loop pipe 25. Accordingly, after being dispersed in the hot air, the granulated substances are fed to the loop pipe 25. As a result, an accumulation of granulated substances is unlikely to occur, making it possible to minimize the amount of hot air. In this manner, the drying device 90 can carry out the drying process without supplying a larger volume of air than needed; the drying device can efficiently dry the granulated substances in such a way as not to turn the granulated substances into powder. Meanwhile, unwanted coarse granules are regulated in particle size. Therefore, a particle size regulation process can be omitted at a later stage.

Meanwhile, the dispersion mechanism 91 can employ not only the configuration of a reducer but also various other types of configuration. FIG. 16 is an explanatory diagram showing variants of the dispersion mechanism. FIG. 16A shows the configuration of a decentered small cross section portion 94. FIG. 16B shows the configuration of a small cross section portion 94 formed by a baffle plate 95. FIG. 16C shows the configuration of a small cross section portion 94 that is formed by a spiral baffle plate 96 disposed in the pipe. FIG. 16D shows the configuration of a small cross section portion 94 that is formed by semicircular baffle plates 97 disposed in the upper and lower portions of the pipe. FIG. 16E shows the configuration of a small cross section portion 94 that is formed by a perforated plate 98, or punching plate, disposed in the pipe.

The present invention is not limited to the above-described embodiments; various changes may be made without departing from the spirit of the invention.

For example, the diameter or winding diameter of the loop pipe 25, and other factors such as the number of stages can be appropriately changed; the various dimensions and specifications disclosed in the above-described embodiments may be appropriately changed. The present invention is not limited to the above-described dimensions and specifications. What has been described in the second embodiment is the structure in which one fitting joint 61 and two guide joints 62 are provided. However, any number of joints can be provided; the number of joints is not limited to the above-described one. Furthermore, the convex joint 61a and the concave joint 61b may be disposed at the upper side and the lower side, respectively, or vice versa. The installation positions of the joints are not limited to those of the above-described embodiments.

A plurality of dispersion mechanisms 91 maybe mounted when necessary. By adjusting both the number of dispersion mechanisms 91 and the volume of air, it is possible to control the particle size of dried granulated substances. The dispersion mechanisms 91 may be provided in the middle of the loop pipe or between the dry process portion and the recovery portion, as well as between the to-be-processed introduction portion and the dry process portion. In the case of the third embodiment, the loop pipe 25 and the stainless steel pipe 21 are equal in diameter. Instead, as in the case of the first or second embodiment, the loop pipe 25 may be larger in diameter than the stainless steel pipe 21.

INDUSTRIAL APPLICABILITY

The present invention can be applied not only to the process of drying wet granulated substances to be used as medicines, but also to a process of drying hydrous granulated substances to be used as raw materials such as those of food and fertilizer.

EXPLANATION OF REFERENCE SYMBOLS

1: Drying device
2: High-speed stirring granulator
3: Extrusion granulator
4: Wet granulated substance continuous feeding device
11: Granulated substance introduction portion
12: Dry process portion
13: Product ejection portion
14: Hot air feeding device
21: Stainless steel pipe
22: Granulated substance inlet
23: Hot air inlet
24: Hopper
25: Loop pipe (processing pipe)
25a: Loop pipe upper stage (first stage)
25b: Loop pipe lower stage (second stage)
26: Cyclone collector (powder particle collecting device)
27: Connection pipe
31: Loop pipe unit (processing pipe unit)
31a, 31b: Loop pipe unit
31a1: One end side of loop pipe unit
31a2: Other end side of loop pipe unit
31b1: One end side of loop pipe unit
31b2: Other end side of loop pipe unit
32a, 32b: Connector
33a, 33b: Spigot-and-socket connection portion
34: Packing
35a, 35b: Straight pipe part
36: Loop pipe unit body
41: Loop pipe (processing pipe)
42: Protrusion
43: Loop pipe (processing pipe)
44: Loop pipe (processing pipe)
45: Slope portion
46: Discharge opening
47: Loop pipe (processing pipe)
50: Drying device
51: Loop pipe unit (processing pipe unit)
51a: One end of loop pipe unit
51b: Other end of loop pipe unit
51p: Lower-stage first-half loop pipe unit
51q: Lower-stage second-half loop pipe unit
51r: Upper-stage first-half loop pipe unit
51s: Upper-stage second-half loop pipe unit
52a, 52b: Connector
53a, 53b: Spigot-and-socket connection portion
54a, 54b: Packing
55a, 55b: Straight pipe part
56: Body
57: Joint portion
58: Support leg
58a to 58f: Support leg
59: Housing
61: Fitting joint
61a: Convex joint
61b: Concave joint
62: Guide joint
62a: Convex joint
62b: Concave joint
63: Curved pipe portion
64: Connection portion
65: Outer tube portion
66: Inner tube portion
67: Tip portion
67a: Tip portion inner peripheral surface
67b: Tip surface
68: Fitting groove
69: First sealed portion
71: Second sealed portion
72a, 72b: Fitting joint
73: Convex joint body
74: Joint protrusion
75: Concave joint body
76: Fitting hole
77: Convex joint body
78: Joint protrusion
79: Concave joint body
79a: Tip surface
81: Fitting hole
82: Guide groove
82a: Inclined surface
90: Drying device
91: Dispersion mechanism
92: Introduction portion
93: Feeding portion
94: Small cross section portion
95: Baffle ring
96: Spiral baffle plate
97: Semicircular baffle plate
98: Perforated plate
O: Loop pipe center (central axis)
R: Loop pipe winding diameter
Θ: Loop pipe inclination angle

The invention claimed is:

1. An airflow drying device configured to dry wet granulated substances with hot air, the airflow drying device comprising:

a granulated substance introduction portion that includes a granulated substance inlet, into which the granulated substances are to be put, and a hot air inlet, through which the hot air is to be supplied;

a dry process portion configured to follow the granulated substance introduction portion and communicate with the granulated substance introduction portion and through which the granulated substances are to flow together with the hot air; and a product ejection portion configured to follow the dry process portion and communicate with the dry process portion and from which the granulated substances are to be discharged together with the hot air after passage through the dry process portion, wherein:

the dry process portion includes a processing pipe that is a tubular member having an annular shape and a constant diameter, and the processing pipe is positioned laterally in a horizontal direction with the tubular member winding one or more times, the processing pipe comprises a plurality of processing-pipe units with a curved portion formed of one member having the constant diameter, the processing pipe is dividable along a circumferential direction at each of multiples stages so as to facilitate cleaning and visible checking of an inner portion of the processing pipe, and the airflow drying device is configured to exert a centrifugal force on the granulated substances while the granulated substances flow through the processing pipe and are being dried by the hot air such that the wet granulated substances remain granules when being dried, without being crushed or turned into powder.

2. The airflow drying device according to claim 1, wherein each of the processing pipe units includes a connection portion that can be airtightly connected to another of the processing pipe units, and the connection portion is connected so as to allow the corresponding processing pipe unit to turn, and the processing pipe units are configured to be connected to each other while turning the connection portions and while the processing pipe is stacked in multiple stages without twisting a body portion of any of the processing pipe units.

3. The airflow drying device according to claim 1, wherein:

the processing pipe is spirally positioned in an up-down direction in a communicating state;

the processing pipe includes an upper processing pipe and a lower processing pipe;

between the upper processing pipe and the lower processing pipe, a joint portion is included to position the upper processing pipe and to support the upper processing pipe above the lower processing pipe; and the joint portion includes a first joint member, which is on an upper portion of the processing pipe, and a second joint member, which is on a lower portion of the processing pipe and can be attached to or detached from the first joint member.

4. The airflow drying device according to claim 3, wherein the joint portion includes:

a fitting joint in which the first joint member and the second joint member are fitted together in the up-down direction through concave and convex portions, and a guide joint that allows the first joint member and the second joint member to be fitted together in the up-down direction through concave and convex portions while including a guide portion where the first joint member and the second joint member can move relative to the horizontal direction.

5. The airflow drying device according to claim 4, wherein:

the fitting joint includes a joint protrusion, which is on one of the first joint member and the second joint member, and a fitting hole, which is on the other of the first joint member and the second joint member and into which the joint protrusion is to be inserted; and the guide joint includes a joint protrusion, which is on one of the first joint member and the second joint member, a fitting hole, which is on the other of the first joint member and the second joint member, and a guide groove, which is defined so as to communicate with the fitting hole and extend in a radial direction, and the joint protrusion is configured to be guided by the guide groove in the horizontal direction when being inserted into the fitting hole.

6. The airflow drying device according to claim 3, wherein:

the processing pipe units are semicircular;

each of the processing pipe units includes a connection portion to airtightly connect to another of the processing pipe units; and the connection portion includes a first sealed portion, which has a seal member that is to be pressed against in a radial direction, and a second sealed portion, which has a seal member that is to be pressed against in an axial direction.

7. The airflow drying device according to claim 6, wherein the joint portion is positioned such that the second sealed portion is being pressed against in the axial direction when the first joint member is connected to the second joint member, thereby bringing about an airtight state.

8. The airflow drying device according to claim 1, further comprising:

a to-be-processed substance dispersion mechanism between the granulated substance introduction portion and the dry process portion, the to-be-processed substance dispersion mechanism including a smaller cross section portion having a cross section which is smaller than a cross section of the granulated substance introduction portion and a cross section of the dry process portion.

9. The airflow drying device according to claim 8, wherein the to-be-processed substance dispersion mechanism includes an introduction portion, which is connected to the granulated substance introduction portion, and a feeding portion, which is connected to the dry process portion, and the smaller cross section portion is between the introduction portion and the feeding portion.

10. The airflow drying device according to claim 9, wherein:

the introduction portion is configured to communicate with the smaller cross section portion so as to become smaller in diameter with respect to the granulated substance introduction portion; and the feeding portion is configured to communicate with the dry process portion so as to become larger in diameter with respect to the smaller cross section portion.

11. The airflow drying device according to claim 9, wherein the granulated substances are increased in speed in the introduction portion when being introduced from the granulated substance introduction portion into the smaller cross section portion, and the granulated substances are dispersed in a radial direction in the feeding portion when being sent from the smaller cross section portion into the dry process portion.

12. An airflow drying device configured to dry wet granulated substances with hot air, the airflow drying device comprising:
   a granulated substance introduction portion that includes a granulated substance inlet, into which the granulated substances are to be put, and a hot air inlet, through which the hot air is to be supplied;
   a dry process portion configured to follow the granulated substance introduction portion and communicate with the granulated substance introduction portion and through which the granulated substances are to flow together with the hot air; and
   a product ejection portion configured to follow the dry process portion and communicate with the dry process portion and from which the granulated substances are to be discharged together with the hot air after passage through the dry process portion, wherein:
   the dry process portion includes a processing pipe that is a tubular member having an annular shape and a constant diameter, and the processing pipe is positioned with an inclination of 45 degrees or less to a horizontal direction with the tubular member winding one or more times,
   the processing pipe comprises a plurality of processing-pipe units with a curved portion formed of one member having the constant diameter,
   the processing pipe is dividable along a circumferential direction at each of multiple stages so as to facilitate cleaning and visible checking of an inner portion of the processing pipe, and
   the airflow drying device is configured to exert a centrifugal force on the granulated substances while the granulated substances flow through the processing pipe and are being dried by the hot air such that the wet granulated substances remain granules when being dried, without being crushed or turned into powder.

* * * * *